United States Patent [19]
Soga et al.

[11] Patent Number: 5,679,462
[45] Date of Patent: Oct. 21, 1997

[54] FIXING APPARATUS

[75] Inventors: Setsuo Soga, Tokyo; Toshiya Yabei, Yokohama; Jun Okamoto; Yasuhiro Kohira, both of Tokyo, all of Japan

[73] Assignee: Ricoh Company, Ltd., Tokyo, Japan

[21] Appl. No.: 576,365

[22] Filed: Dec. 21, 1995

[30] Foreign Application Priority Data

Jan. 6, 1995 [JP] Japan ................. 7-000809
Dec. 14, 1995 [JP] Japan ................. 7-325966

[51] Int. Cl.⁶ ............................................ B32B 9/04
[52] U.S. Cl. ............... 428/447; 428/450; 492/46; 430/33; 430/99; 399/333
[58] Field of Search .................. 428/447, 450, 428/35.7, 35.8, 36.8; 492/46; 430/33, 99; 399/333

[56] References Cited

U.S. PATENT DOCUMENTS

| | | | |
|---|---|---|---|
| 4,287,280 | 9/1981 | Swift | 430/99 |
| 4,813,868 | 3/1989 | Soga | 432/8 |
| 4,934,930 | 6/1990 | Soga | 432/60 |
| 4,951,160 | 8/1990 | Nagahara et al. | 358/496 |
| 4,977,308 | 12/1990 | Soga | 219/469 |
| 4,987,457 | 1/1991 | Mochizuki et al. | 355/285 |
| 5,068,692 | 11/1991 | Menjo | 355/284 |
| 5,300,996 | 4/1994 | Yokoyama et al. | 355/285 |

*Primary Examiner*—Mark Chapman
*Attorney, Agent, or Firm*—Oblon, Spivak, McClelland, Maier & Neustadt, P.C.

[57] ABSTRACT

A fixing apparatus for fixing image on a recording sheet or film comprises a fixing roller having a surface comprising a fluororesin and contacting with a toner, a heating means for heating said fixing roller, a rotating pressing roller urged against said fixing roller, and means for applying a releasing agent to the surface of said fixing roller, characterized in that said releasing agent comprises a fluorosilicone represented by the following formula (I):

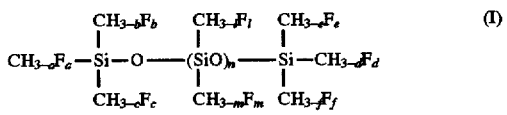

wherein a, b, c, d, e and f independently denote an integer of 0 to 3, l and m are an integer of 0 to 3 with a proviso that $1 \leq l+m \leq 6$, and n is an integer of 1 or more.

12 Claims, 2 Drawing Sheets

FIXING APPARATUS

BACKGROUND OF THE INVENTION

1. Field of the Invention

The present invention relates to a fixing apparatus for an electrophotographic apparatus such as an electrophotographic copier or a laser printer. Particularly, the present invention relates to a fixing apparatus for fixing a toner image transferred on a recording paper or film.

2. Description of the Related Prior Art

An electrophotographic process used in an electrophotographic copier, a laser printer, and an electrophotographic facsimile apparatus comprises:

(a) a photosensitizing step wherein a photoreceptor drum is uniformly charged with an electrostatic charger such as a corona electrical charger in the dark;

(b) an exposure step wherein the photoreceptor drum is imagewise exposed to reflected light from an original by a fluorescent lamp or laser beam from a semiconductor laser to form an electrostatic latent image thereon;

(c) a developing step wherein a toner is deposited on the latent image formed on the photoreceptor drum to form a visible image;

(d) a transferring step wherein the toner image on the photoreceptor drum is electrostatically transferred onto a recording paper or film; and (e) a fixing step wherein heat and/or pressure are applied to the transferred toner image on the recording paper or film to fix the toner image thereon.

In the fixing step, a recording paper or film on which the toner image is formed is generally inserted between a fixing roller heated at a specific temperature by a heating means such as an integrated heater and a pressing roller urged against the fixing roller to melt, press and fix the toner. This fixing process provides a firmly fixed image having a high quality and enables high-speed processing and therefore is widely used now. The "fixing roller" herein means a roller which directly contacts with the toner image.

In addition to black toner, yellow, magenta and cyan toners are generally used in a color electrophotographic apparatus such as a color copier or a color printer. A color image of an original is resolved into red(R), green(G) and blue(B) images and latent images corresponding to these images (R, G and B latent images) are formed on the photoreceptor drum. Subsequently, in the developing step, the R, G and B latent images are developed with cyan, magenta and yellow toners, respectively, and the obtained visible image is transferred to and fixed on a recording paper or film.

For precise reproduction of the color of the original, it is necessary to heat black and color toners on the transferred visible image to melt and mix them so as to produce the original color, and therefore, these toners are desired to have a low softening point.

However, it is well known that a toner having a low softening point tends to offset, i.e., move to the surface of the fixing roller. Further, in a color electrophotographic process, visible (toner) images corresponding to the R and G latent images are superimposed on the visible image corresponding to the B latent image, and therefore, the total thickness of the toner layers tends to be much thicker than that of a monochromatic image. In addition, for obtaining good image gloss and color development of image upon superimposing the toners, so called "sharply melting" toners are used, i.e., the difference between the temperature at which the toner begins to melt and the temperature at which the toner melts completely is small, and therefore, the range of the fixing temperature is likely to be narrow. On account of the above, the toners are more likely to offset in a color electrophotographic apparatus compared with a monochromic electrophotographic apparatus.

In a color electrophotographic apparatus, the surface of the fixing roller is necessarily coated with a releasing agent such as a silicone oil for avoiding the offset of color toners to the roller. Conventional fixing rollers used in a monochromic electrophotographic process generally have a surface formed from a fluororesin. However, in general, a fluororesin is not wetted well with a silicone oil and a roller having a surface formed from a fluororesin is difficult to be used as a fixing roller of a color electrophotographic apparatus.

In a color electrophotographic apparatus wherein an image is formed on only one side of a recording paper, a roller which is coated with an elastomer such as a silicone rubber and has a tetrafluoroethylene/perfluoroalkyl vinyl ether copolymer (PFA) layer over said elastomer layer can be used as a pressing roller. However, in an apparatus wherein images are formed on both sides of a recording paper, such a roller is difficult to be used as a pressing roller since upon forming an image on the another side of the recording paper, the image previously formed on the opposite side of the recording paper contacts with the pressing roller and the offset to the pressing roller may occur.

JP-A-5-188813 suggests a method for solving the above problem by forming the surfaces of both the fixing and pressing rollers with a silicone rubber and applying a silicone oil thereon. Further, it is suggested to coat the pressing roller with a silicone oil at a larger amount than the fixing roller for avoiding the difference in the gloss between the top and back sides of the recording paper.

However, ingredients of the recording paper and resin, dyestuff and pigment of the color toner tend to stick on the surfaces of fixing and pressing rollers formed of a silicone rubber and the releasing property of the rollers is deteriorated. Consequently, only a small number of copies can be produced before offset occurs.

Additionally, a silicone rubber is easily swollen by a silicone oil and therefore, the wear and abrasion resistance of the fixing and pressing rollers is deteriorated and also the surfaces thereof are easily damaged.

Fixing and pressing rollers of which surfaces are formed of silicone rubber have so short a life time that only about 15,000 copies can be made. Therefore, such rollers cannot be practically used.

The inventors of the present invention have found that offset can be avoided by using a fixing roller of which surface is formed of a fluororesin having an excellent wear and abrasion resistance and employing a specific fluorosilicone as a releasing agent and achieved the present invention.

The object of the present invention is to provide a fixing apparatus for an electrophotographic apparatus such as a copier, laser printer or other wherein substantially no offset occurs. Especially, the object of the present invention is to provide a fixing apparatus suitable for a color copier and a color laser printer.

SUMMARY OF THE INVENTION

The present invention is a fixing apparatus comprising:
a fixing roller having a surface formed of a fluororesin and contacting with a toner of a transferred image on a printing paper or film;

a heating means for heating said fixing roller;

a pressing roller urged against said fixing roller and rotating contrarily thereto; and a means for applying a releasing agent onto the surface of said fixing roller, characterized in that said releasing agent comprises a fluorosilicone having formula (I):

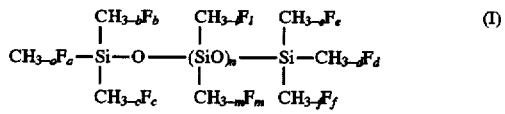

wherein a, b, c, d, e and f independently denote an integer of 0 to 3, 1 and m are integers of 0 to 3 with a proviso that $1 \leq l+m \leq 6$, and n is an integer of 1 or more.

In the present invention, the fixing roller has a surface formed of a fluororesin and is coated with the above fluorosilicone.

As clearly seen from the above formula (I), the fluorosilicone has a structure wherein at least one of the methyl groups of the poly(dimethylsiloxane) is substituted by 1 to 3 fluorine atoms. The fluorosilicone has a low angle of contact with a fluororesin of 3° to 5° and therefore, a fluororesin can be wetted well with the fluorosilicone.

PREFERRED EMBODIMENT OF THE INVENTION

Figure 1:
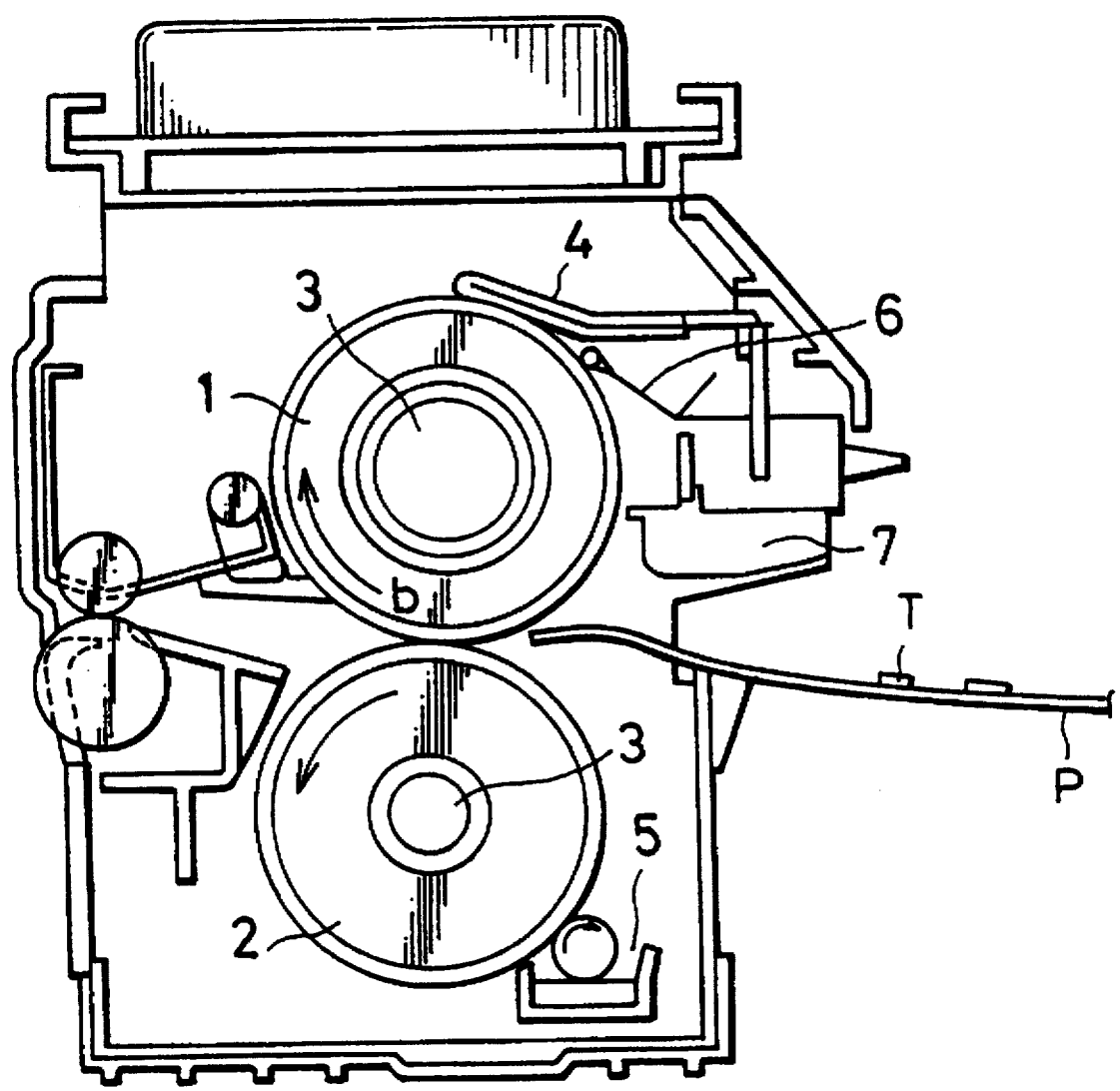
FIG. 1 shows a cross section of an embodiment of the fixing apparatus of the present invention. 1, 2 and 3 denote the fixing roller, the pressing roller and the heating means integrated in the rollers 1 and 2, respectively. 4 is a releasing agent applying member for applying a fluorosilicone to the fixing roller 1. 5 is a releasing agent supplying member for applying a releasing agent to the pressing roller 2. 6 is a blade for controlling the amount of the releasing agent on the surface of the fixing roller 1. 7 is an oil pan. P is a recording paper or film. T is a visible image formed on the recording paper or film P.

In the fixing apparatus of FIG. 1, the fixing roller 1 is pressed on the pressing roller 2 and the recording paper or film P onto which a visible image T is transferred is inserted between the fixing roller 1 and the pressing roller 2 so that the visible image T contacts with the fixing roller 1. While the recording paper or film P advances between the fixing roller 1 and the pressing roller 2, the toner of the visible image T is heated, melts and is pressed into the recording paper or film P and thus the visible image T is fixed.

The fixing roller 1 can be externally irradiated and heated by a heater or an infrared ray lamp, or can be internally heated by the heating means 3 integrated in the fixing roller 1 as shown in FIG. 1.

The releasing agent applying member 4 always contacts with the fixing roller 1 and the releasing agent is applied to the fixing roller 1 through said member 4. At least the part of said releasing agent applying member 4 contacting with the fixing roller 1 can be made of a felt. Further, the releasing agent is supplied to said member 4 through a means for dropping the agent, not shown.

Adjoining to the releasing agent applying member 4, a blade 6 is provided so that said blade also contacts with the fixing roller 1. The amount of the releasing agent on the fixing roller 1 is appropriately controlled by the blade 6. The releasing agent scratched off by the blade 6 is collected in the oil pan 7.

When used in a double side copier, wherein the visible image T on the recording paper or film P also contacts with the pressing roller 2, in addition to the releasing agent applying member 4, the releasing agent supplying member 5 can be optionally attached to the fixing apparatus to apply the releasing agent to the pressing roller 2.

In the following, each of the elements of the present apparatus is explained in detail.

Fixing roller:

Fixing roller 1 is a roller comprising an aluminium core coated with a fluororesin. A roller comprising an aluminium core covered with a silicone rubber and covered with a fluororesin over said silicone rubber layer can be more preferably used since this type of roller provides more definite images.

The surface of the fixing roller 1 comprises a fluororesin selected from the group of tetrafluoroethylene-perfluoroalkyl vinyl ether copolymer (PFA), poly(tetrafluoroethylene) (PTFE), poly(chlorotrifluoroethylene) (PCTFE), poly(vinyl fluoride) (PVF), poly(vinylidene fluoride) (PVdF), tetrafluoroethylene-hexafluoropropylene copolymer (FEP), ethylene-tetrafluoroethylene copolymer (ETFE) and ethylene-chlorotrifluoroethylene copolymer (ECTFE). Among the above fluororesin, tetrafluoroethylene-perfluoroalkyl vinyl ether copolymer (PFA) can be most preferably used since an article having a surface substantially free of pin hole is easily obtained by injection molding of PFA.

Pressing Roller:

Pressing roller 2 can be a roller comprising an aluminium core coated with a silicone rubber. Pressing roller 2 is optionally coated with a fluororesin over the silicone rubber layer. Further, a heating means such as a halogen lamp can be optionally integrated therein. The same fluororesin as mentioned for the fixing roller 1 can be employed for coating the pressing roller 2.

Fluorosilicone:

As the releasing agent to be applied to the fixing roller 1, a fluorosilicone having the following formula (I):

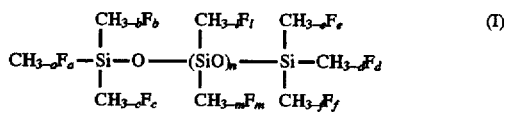

wherein a, b, c, d, e and f are independently an integer of 0 to 3, 1 and m are integers of 0 to 3 with a proviso that $1 \leq l+m \leq 6$, and n is an integer of 1 or more is used.

In the fluorosilicone used in the present invention, the methyl groups attached to the terminal Si may be unsubstituted or substituted with F; however, each of these terminal methyl groups is preferably substituted with 1 to 3 F.

On the other hand, in the dimethyl siloxane units represented by the formula:

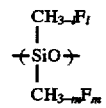

at least one of the methyl groups $CH_3\text{-}_lF_l$ and $CH_3\text{-}_mF_m$ should be substituted with at least one F. Therefore, 1+m, the total number of F in one dimethyl siloxane unit is an integer of from 1 to 6, preferably, 4 to 6.

The above fluorosilicone preferably has an index of refraction of 1.38 or less, more preferably, 1.36 or less since such a fluorosilicone has a good wettability with a fluororesin.

Further, the above fluorosilicone also preferably has a viscosity of 50 to 1,000 cp at 25° C., more preferably, 100 to 500 cp.

FLS 300 (from Asahi Glass, Co. Ltd., viscosity:300 cp) can be mentioned as an example of the fluorosilicone of the present invention.

The fluorosilicone which can be used in the present invention has a surface tension of about 17 to 18 dyne/cm which is lower as compared with the surface tension of 21 dyne/cm of a conventional silicone oil (poly(dimethyl siloxane)). Consequently, the fluorosilicone of the present invention has an angle of contact with Teflon (the trade name of Du Pont) of 3° to 5°, which is much lower than the contact angle of a conventional silicone oil of 30° to 40°, and has a good wettability with a fluororesin.

Therefore, even though formed of a fluororesin, the surface of the fixing roller is well wetted with the fluorosilicone releasing agent, and substantially no offset occur even when used in a fixing apparatus of a color electrophotographic apparatus. Additionally, the fluororesin by itself has a superior wear and abrasion resistance and non-adhesiveness as compared with a silicone rubber. Therefore, not only the life duration of a roller is extended but also more copies can be made before offset occurs.

EXAMPLES

The present invention is further illustrated by the following examples. It should be understood that the examples are only intended to illustrate the present invention but not to limit it.

Example 1

A fixing apparatus as shown in FIG. 1 was installed in Preter 550 copier (from Ricoh Company, Ltd.) and single-side color copies were made to assess the liability to offset.

Fixing roller 1 comprised an aluminium core covered with Teflon layer and had an overall outer diameter of 60 mm. While, pressing roller 2 also had an outer diameter of 60 mm, comprised an aluminium core covered with silicone rubber layer of a thickness of 6 mm and had a PFA layer of 70 μm in thickness on said silicone rubber layer. As heating means 3, halogen lamps were integrated in the aluminium cores of both the fixing and pressing rollers. The surfaces of fixing roller 1 and pressing roller 2 were kept at a temperature of 160° C.

A releasing agent was applied to the surface of fixing roller 1 with the releasing agent applying member 4 contacting with the surface of fixing roller 1. The releasing agent was also applied to the surface of pressing roller 2 with the releasing agent supplying member 5 contacting with the surface of pressing roller 2.

As the releasing agent, fluorosilicone FLS 300 (from Asahi Glass Co., Ltd., having a viscosity of 300 cp at 25° C., an index of refraction of 1.38 and a molecular weight of about 1,000) was used.

As a result, no offset occurred even after more than 40,000 copies were made.

Comparative Example 1

Except for using a silicone oil (KF-96 from Shin-Etsu Chemical Co., Ltd., having a viscosity of 300 cs (25° C.), an index of refraction of 1.40 and a molecular weight of 14,000) as the releasing agent, the test was carried out as in Example 1. Offset occurred on the first copy.

Example 2

Except for carrying out double-side copying, the test was carried out as in Example 1. As Example 1, no offset occurred even after more than 40,000 copies.

Example 3

Except for using fixing roller 1 comprising an aluminium core covered with a PFA tube having a thickness of about 50 μm (the overall outer diameter being 60 mm), the test was carried out as in Example 1. Not only no offset occurred even after more than 40,000 copies, but also clearer images than in Example 1 were obtained.

Example 4

Except for using fixing roller 1 comprising an aluminium core covered with a silicone rubber layer having a thickness of 1 mm and further covered with a PFA tube having a thickness of about 50 μm thereon (the overall outer diameter being 60 mm), the test was carried out as mentioned in Example 1. Not only no offset occurred even after more than 40,000 copies, but also clearer images than in Example 3 were obtained.

Example 5

Except for using a fluorosilicone having an index of refraction of 1.39, the test was carried out as in Example 1. Offset occurred when the number of copies exceeded 10,000.

Reference Example

The above examples revealed that the number of copies which could be made before offset occurred depended on the index of refraction of the fluorosilicone used.

Figure 2:
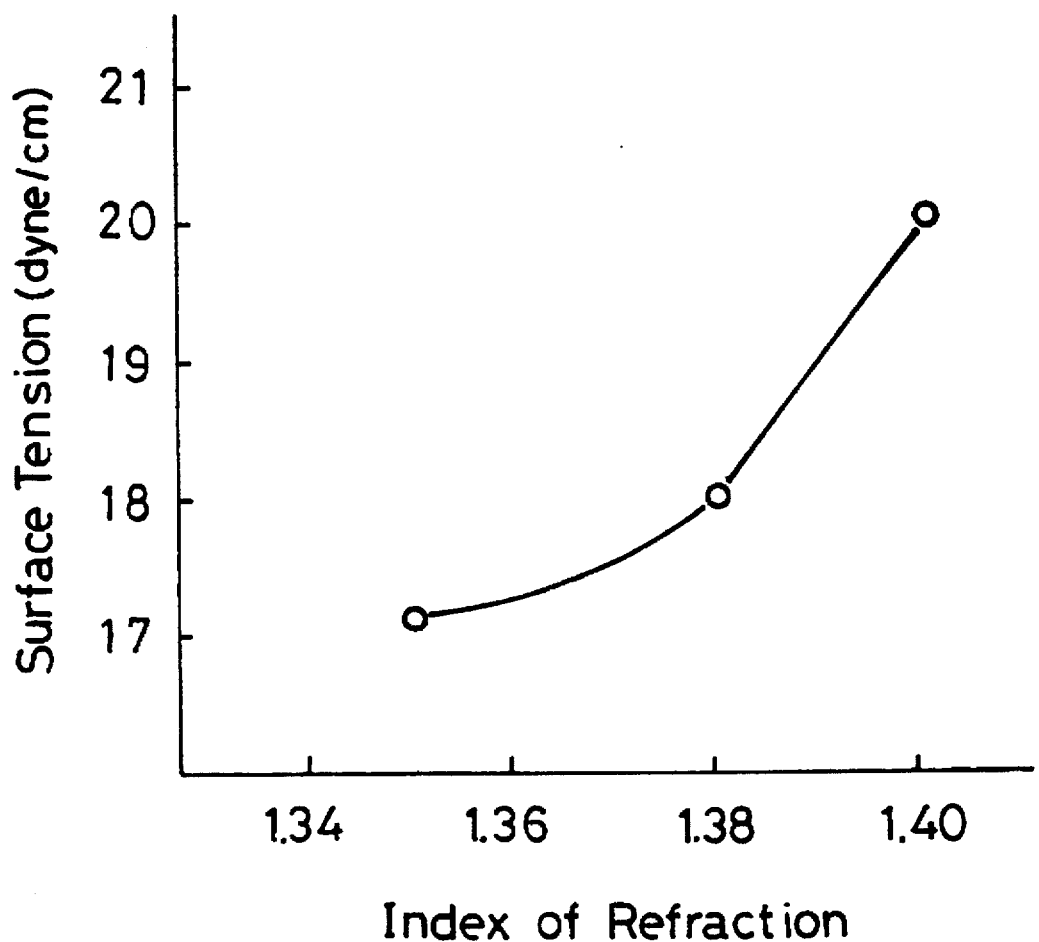
FIG. 2 shows a relation between the index of refraction and the surface tension of a fluorosilicone.

Consequently, the relation between the index of refraction and the surface tension of fluorosilicones was investigated to obtain the result as shown in FIG. 2. As seen from FIG. 2, a fluorosilicone having an index of refraction of 1.38 or less, which was revealed to be a preferable releasing agent from the above examples, exhibited a low surface tension of 18 dyne/cm or less.

What is claimed is:

1. Fixing apparatus comprising a fixing roller having a surface comprising a fluororesin and contacting with a toner, a heating means for heating said fixing roller, a rotating pressing roller urged against said fixing roller, and means for applying a releasing agent to the surface of said fixing roller, characterized in that said releasing agent comprising of a fluorosilicone represented by the following formula (I):

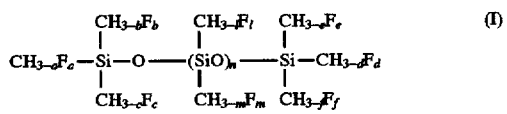

wherein a, b, c, d, e and f independently denote an integer of 0 to 3, 1 and m are an integer of 1 or more, wherein said fluorosilicone has a viscosity of 50 to 1,000 cp at 25° C.

2. Fixing apparatus of claim 1 further comprising a releasing agent supplying member for applying the releasing agent to the surface of the pressing roller.

3. Fixing apparatus of claim 2 wherein the fixing roller has a surface comprising a fluororesin selected from tetrafluoroethylene-perfluoroalkyl vinyl ether copolymer (PFA), poly(tetrafluoroethylene) (PTFE), poly(chlorotrifluoroethylene) (PCTFE), poly(vinyl fluoride) (PVF), poly(vinylidene fluoride) (PVdF), tetrafluoroethylene-hexafluoropropylene copolymer (FEP), ethylene-tetrafluoroethylene copolymer (ETFE) and ethylene-chlorotrifluoroethylene copolymer (ECTFE).

4. Fixing apparatus of claim 2 wherein said releasing agent is a fluorosilicone having an index of refraction of 1.38 or less.

5. Fixing apparatus of claim 2 wherein said releasing agent is a fluorosilicone having the formula (I) in which $4 \leq l+m \leq 6$.

6. Fixing apparatus of claim 1 wherein the heating means is integrated in the fixing roller.

7. Fixing apparatus of claim 6 wherein the fixing roller has a surface comprising a fluororesin selected from tetrafluoroethylene-perfluoroalkyl vinyl ether copolymer (PFA), poly(tetrafluoroethylene) (PTFE), poly(chlorotrifluoroethylene) (PCTFE), poly(vinyl fluoride) (PVF), poly(vinylidene fluoride) (PVdF), tetrafluoroethylene-hexafluoropropylene copolymer (FEP), ethylene-tetrafluoroethylene copolymer (ETFE) and ethylene-chlorotrifluoroethylene copolymer (ECTFE).

8. Fixing apparatus of claim 6 wherein said releasing agent is a fluorosilicone having an index of refraction of 1.38 or less.

9. Fixing apparatus of claim 6 wherein said releasing agent is a fluorosilicone having the formula (I) in which $4 \leq l+m \leq 6$.

10. Fixing apparatus of claim 1 wherein the fixing roller has a surface comprising a fluororesin selected from tetrafluoroethylene-perfluoroalkyl vinyl ether copolymer (PFA), poly(tetrafluoroethylene) (PTFE), poly(chlorotrifluoroethylene) (PCTFE), poly(vinyl fluoride) (PVF), poly(vinylidene fluoride) (PVdF), tetrafluoroethylene-hexafluoropropylene copolymer (FEP), ethylene-tetrafluoroethylene copolymer (ETFE) and ethylene-chlorotrifluoroethylene copolymer (ECTFE).

11. Fixing apparatus of claim 1 wherein said releasing agent is a fluorosilicone having an index of refraction of 1.38 or less.

12. Fixing apparatus of claim 1 wherein said releasing agent is a fluorosilicone having the formula (I) in which $4 \leq l+m \leq 6$.

\* \* \* \* \*